United States Patent [19]

Kraus et al.

[11] Patent Number: 4,996,891
[45] Date of Patent: Mar. 5, 1991

[54] INFINITELY VARIABLE TRACTION ROLLER TRANSMISSION

[75] Inventors: Charles E. Kraus; Charles B. Lohr, both of Austin, Tex.

[73] Assignee: Excelermatic Inc., Austin, Tex.

[21] Appl. No.: 428,974

[22] Filed: Oct. 30, 1989

[51] Int. Cl.$^5$ ............................................. F16H 15/38
[52] U.S. Cl. ..................................... 74/200; 74/190.5; 74/208
[58] Field of Search ....................... 74/190.5, 200, 208

[56] References Cited

U.S. PATENT DOCUMENTS

| | | | |
|---|---|---|---|
| 4,086,820 | 5/1978 | Kraus et al. | 74/200 |
| 4,830,578 | 5/1989 | Kraus | 74/190.5 |
| 4,911,030 | 3/1990 | Kraus | 74/200 |
| 4,955,246 | 9/1990 | Nakano | 74/200 |

*Primary Examiner*—Allan D. Herrmann
*Assistant Examiner*—Julie A. Krolikowski

[57] ABSTRACT

In an infinitely variable transmission wherein two toric traction discs are rotatably supported opposite one another so as to define therebetween a toric cavity in which at least two motion transmitting traction rollers are disposed in engagement with the toric discs and supported by pivot trunnions, and in which each pivot trunnion is provided with a single support roller disposed on a track section and has an axial control end which is supported so as to be movable in a plane normal to the axis of the toric discs, the support rollers are engaged by track members which are tiltably supported and associated with the control ends of the trunnions so as to transmit transmission torque reaction forces to the track members for forcing the traction rollers into engagement with the toric discs and means are provided for controllably moving the trunnion control ends for initiation of a transmission ratio change.

9 Claims, 3 Drawing Sheets

INFINITELY VARIABLE TRACTION ROLLER TRANSMISSION

BACKGROUND OF THE INVENTION

1. Field of the Invention

The invention relates to an infinitely variable traction roller transmission in which power is transmitted through traction rollers pivotally supported between toric input and output discs.

2. Description of the Related Art

In such transmissions, the traction rollers are mounted on support structures which, when pivoted, cause engagement of the traction rollers with the toric discs in circles of varying diameters depending on the desired transmission ratio. The pivotal traction roller support structures are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

In U.S. Pat. No. 4,830,578 by Charles E. Kraus in which two traction rollers are arranged between, and in engagement with, opposite toric traction discs for the transmission of motion therebetween, each traction roller is supported by a pivotal support trunnion which has supported rollers disposed at opposite ends thereof and supported on rollers disposed at opposite ends thereof and supported on partial circular tracks disposed on the housing's rollers are supported on the pivot trunnions by force transmitting means which, for inexpensive transmissions, include stacks of Belleville springs. The housing tracks may have a center of curvature which is slightly off-set with regard to the pivot axis of the trunnions in order to provide greater compression of the Belleville spring, that is, greater disc engagement forces in one pivotal end position of the pivot trunnions than in their opposite pivotal end positions.

The arrangement according to applicant's application Ser. No. 07/259,043 utilizes a single support roller for each trunnion which is received in a partial circular track section mounted in the housing for forcing the trunnion and the associated traction roller into firm engagement with the toric discs for permitting transmission of motion therebetween. An axially projecting control end of each trunnion is supported so as to be slightly movable in a plane normal to the axis of the toric discs, the control ends of the trunnions having means associated therewith for tilting the trunnions in unison in said plane for the initiation of a transmission ratio change.

The roller engagement forces are obtained by wedges adapted to force the track section toward the toric discs so as to generate the engagement forces for the traction rollers with the toric discs.

While this arrangement proved to work very well, it is the object of the present invention to provide a similar arrangement however with simpler means in order to further reduce cost and increase the reliability of such transmissions.

SUMMARY OF THE INVENTION

This is achieved by an infinitely variable transmission with two toric traction discs rotatably supported opposite one another so as to define therebetween a toric cavity in which at least two traction rollers are disposed in radial symmetry in engagement with the toric discs and supported by pivot trunnions having support rollers disposed on the tracks of track members which are tiltably supported at one of their ends and which have their opposite ends operatively connected to control ends of the trunnions by way of means adapted to transmit transmission torque reaction forces to the track members such that the track members engage the trunnions and force the traction rollers into engagement with the toric discs with an engagement force proportional to the torque transmitted through the transmission.

DESCRIPTION OF THE PREFERRED EMBODIMENT

In principle the transmission arrangement according to the invention is similar to, and operates like, that according to applicant's application Ser. No. 07/259,043 which is incorporated herein by reference so that a detailed description of the whole transmission is not necessary. The support and engagement means for the traction rollers however have been simplified and the description is therefore mainly directed to this structure.

Figure 1:
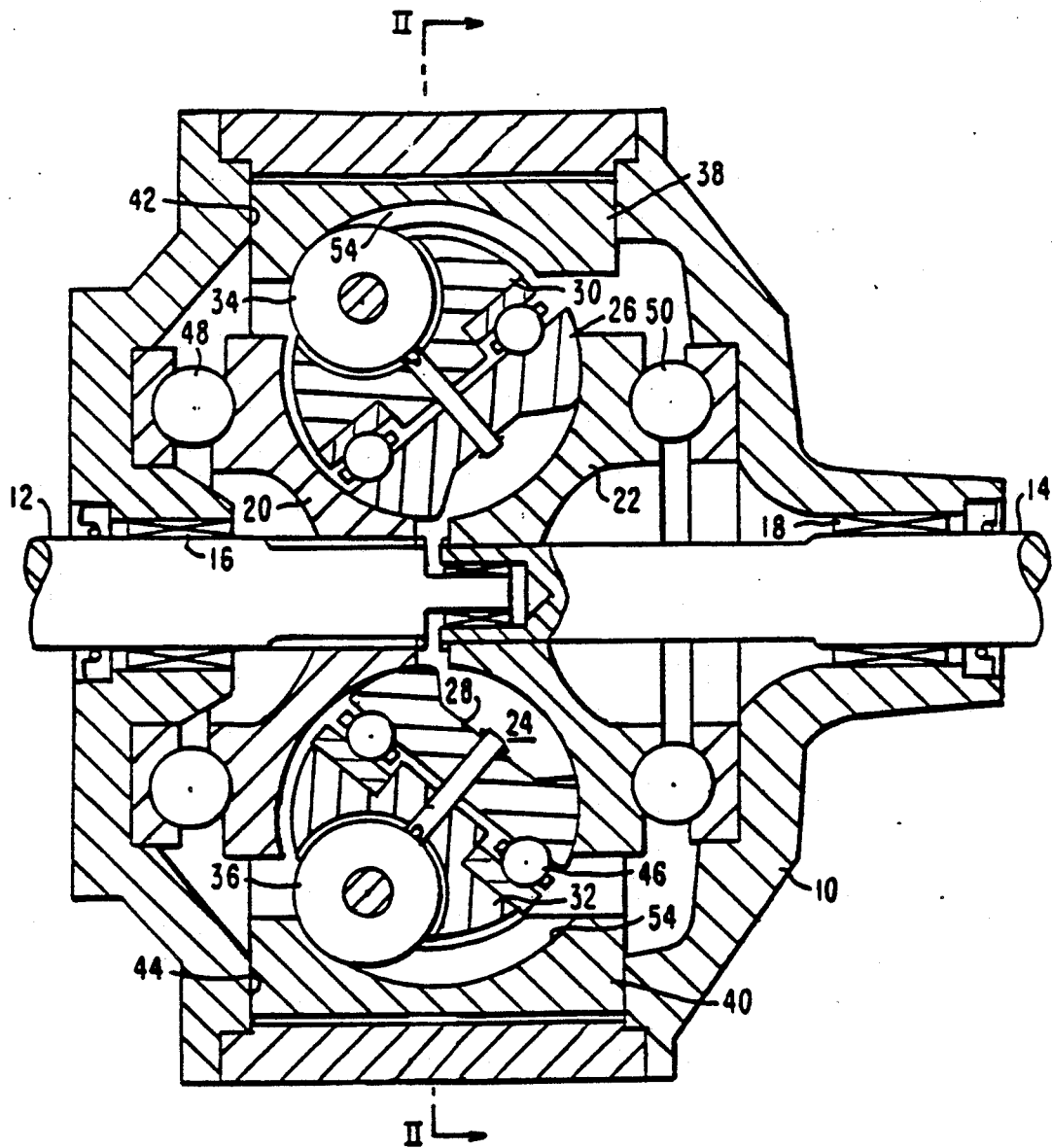
FIG. 1 is an axial cross-sectional view of the traction roller transmission.

A simple traction roller transmission as shown in FIG. 1 consists of a housing 10 having coaxial input and output shafts 12 and 14 respectively rotatably supported therein by bearings 16 and 18. Associated with the input and output shafts 12, 14 are toric discs 20, 22 which are so arranged opposite one another that a toric cavity 24 of circular cross-section is defined therebetween. Within the toric cavity 24 traction rollers 26, 28 are rotatably supported in engagement with the toric traction discs 20, 22. The traction rollers 26, 28 are supported in the housing 10 by pivot trunnions 30 and 32 which are pivotally supported by way of trunnion rollers 34 and 36 running on hard metal track members 38, 40 received in track cavities 42, 44 formed in the housing 10. Each of the pivot trunnions 30, 32 carries a traction roller bearing 46 for rotatably supporting the associated traction rollers 26, 28 which are forced into firm engagement with the traction discs 20 and 22 by way of the trunnion rollers 34, 36, the traction discs 20 and 22 being axially supported by axial thrust bearings 48 and 50. The engagement forces of the traction rollers 26, 28 with the toric traction discs 20, 22 depend on the loading applied by the track members 38, 40. The track members 38, 40 have partial circular support grooves 54 which have centers of curvature disposed on control axes which are tangential to the center circle of the toric cavity 24 such that the pivot trunnions 30, 32 are supported so as to pivot about such control axes. The circular support grooves 54 in the track members 38, 40 may be slightly eccentric with respect to the center circle of curvature of the toric cavity 24 in order to provide larger contact forces for the traction rollers in one pivotal end position of the pivot trunnions 30 and 32, specifically, in the position for lowest output shaft speed and highest output shaft torque as shown in FIG. 1.

Figure 2:
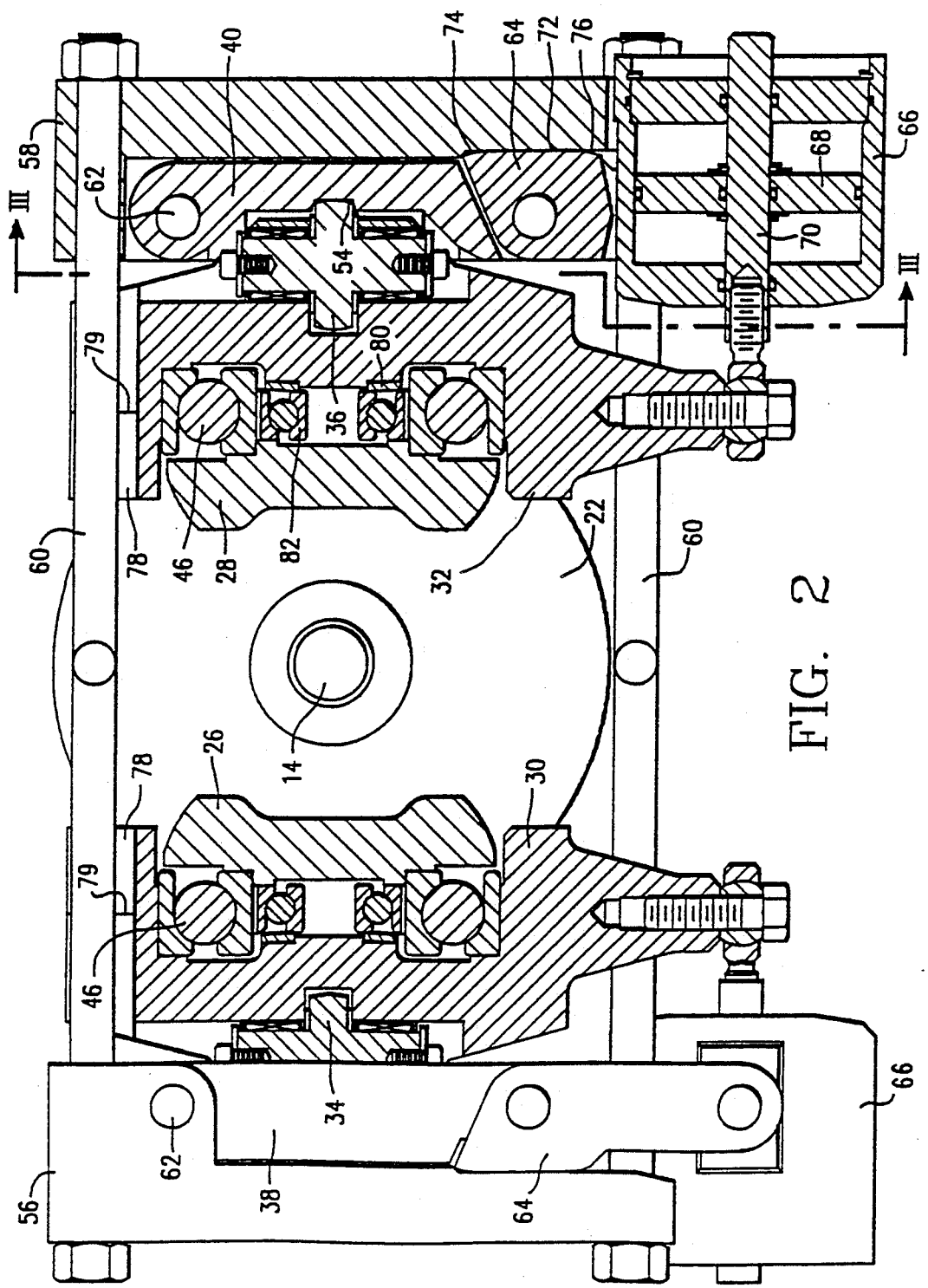
FIG. 2 is a cross-sectional view along line II—II of FIG. 1.

FIG. 2 shows the transmission without a housing. There are opposite support plates 56 and 58 which are held together by retaining rods 60. The track members 38 and 40 are pivotally supported at one end by pivotal supports or by hinges 62 as shown in the drawings. At their other ends they are hinged to leverage arms 64 which abut the support members 56 and 58. The support members 56 and 58 carry operating cylinders 66 provided with pistons 68 and piston rods 70 which are linked to the control ends of the trunnions 30 and 32. The trunnions 30 and 32 carry the traction rollers 26 and 28 as mentioned earlier and are forced toward the toric discs 20 and 22 by the track members 38 and 40 with engagement forces which depend on the control forces applied by the pistons 68 and piston rods 70 to the adjacent control ends of the trunnions 30 and 32 are which are generated by the reaction forces transmitted from the cylinder 66 to the cylinder support ends of the leverage arms 64. The leverage arms 64 have force control surfaces 72 which provide for some leverage to multiply the traction roller engagement forces applied to the trunnions 30 and 32 by way of the trunnion rollers 34 and 36.

Preferably the force control surfaces 72 of the leverage arm 64 are somewhat curved at their opposite ends 74 and 76 to provide for reduced wear at their tilting edges. The leverage arms 64 are preferably forked with the cylinders 66 received between the forked arms and linked to their free ends.

Figure 3:
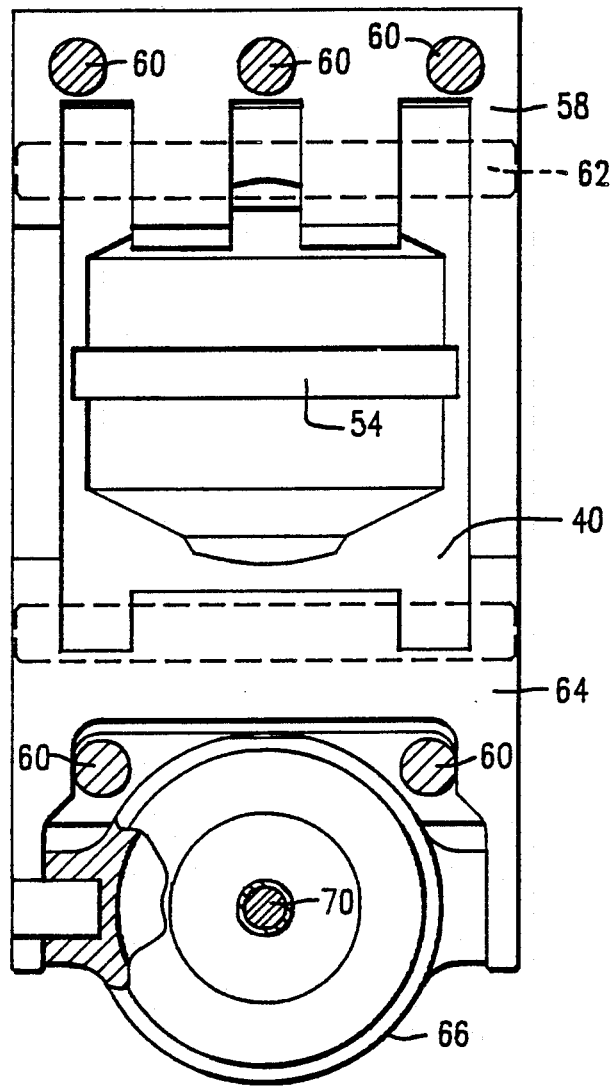
FIG. 3 is a view along line III—III of FIG. 2.

As shown in FIG. 3 there are two retaining rods 60 extending between the support members 56 and 58 at one side of the transmission and three at the opposite side thereof, a center retaining rod and two outer retaining rods. Referring again to FIg. 2 adjacent the center rod 60 the trunnions 30, 32 are provided with grooves 78 which receive the center rod 60 and which are so shaped and sized that the pivotal end positions of the trunnions is limited by their engagement of the center rod 60. The narrowest center sections 79 of the grooves 78 are disposed in a plane receiving the pivot axis of the trunnions.

The traction roller bearings 46 are shown in FIG. 2 are such that they permit inward movement of the traction rollers into engagement with the toric discs by the force of the Belleville springs 80 applied through the auxiliary bearings 82 in order to keep the traction rollers 26, 28 in engagement with the toric discs 20, 22 even when no torque is transmitted through the transmission.

OPERATION OF THE TRUNNION SUPPORT ARRANGEMENT

Whenever a torque is transmitted through the transmission there is a reaction moment applied to the trunnions 30, 32 by the traction rollers 26, 28 which is taken up by the cylinder 66. The cylinders 66 transmit the respective reaction force to the leverage arm 64 by which they are supported and which are pivoted thereby so as to force the track members 38 and 40 and the associated traction rollers 26 and 28 toward one another and into firm engagement with the toric discs 20, 22 with a force which is proportional to the torque transmitted through the transmission.

For a change of the transmission ratio, admission of pressurized fluid to the cylinders 66 at the appropriate side of the piston 68 is controlled so as to tilt the two trunnions 30, 32 slightly in the same circumferential sense with respect to the axis of the toric discs 20, 22 such that, upon rotation of the toric discs 20, 22 the traction rollers 26, 28 will roll to larger circles of engagement with one and smaller circles of engagement with the other of the toric discs 20, 22. When the desired transmission ratio is reached, the trunnions 30, 32 are returned to their neutral positions in which the momentary transmission ratio is maintained.

The arrangement described requires only one hydraulic cylinder 60 and piston 68 for the support of the trunnion control ends and for generating the traction roller engagement forces. As shown in the drawings there is provided one cylinder 60 for each trunnion and trunnion 30, 32 support. However, with the appropriate linkage, a single cylinder would be sufficient for both trunnions 30, 32 and trunnion supports. The cylinder 60 furthermore requires only low pressure operating fluid sufficient to control trunnion movement while nevertheless providing increased but proportional forces to the trunnion 30, 32 for roller engagement with the toric discs 20, 22. The track members 38, 40 which have the tracks 54 formed therein are preferably wide enough so that they can easily provide support for the trunnions 30, 32 in any pivot position of the trunnions 30, 32. If they are wide enough they may be supported for pivotal movement simply by a fulcrum structure such that no hinged supports are needed.

Generally the transmission assembly as shown in FIG. 2 is disposed in a housing, that is, its own housing or a drive housing in connection with which the transmission is utilized. The assembly is attached to the housing preferably by bolts extending into the bases, but this is not shown in the drawings. By removing the rods from one end, the assembly can be slid into an otherwise fully assembled drive arrangement and the rods 60 can then be replaced through openings provided in the housing.

The transmission as described is quite simple with relatively few parts. It requires operating fluid of only relatively low pressure to provide the different forces necessary for operation and in any case, the whole transmission is easily replaceable in case of failure.

What is claimed is:

1. An infinitely variable traction roller transmission comprising: a transmission support structure; two toric traction discs rotatably supported by said support structure, one for rotation with an input shaft and the other for rotation with an output shaft, said toric discs having opposite traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported by a pivot trunnion adapted to pivot about a control axis which is essentially tangential to the center circle of said toric cavity, each of said pivot trunnions having a support roller mounted thereon and a partial circular track member arranged adjacent each pivot trunnion and supporting the support roller thereof, each of said trunnions further having a control end projecting along said control axis and being pivotally supported so as to be also movable slightly in a plane normal to the axis of said toric discs; and means for controllably tilting said trunnions with respect to the axis of the toric discs so as to provide for precess motion of said traction rollers for initiation of a transmission ratio change, said track members being tiltably supported at one of their ends remote from the control ends of said trunnions and having their opposite ends operatively associated with the control ends of the respective trunnions so as to be forced toward the trunnions as a result of control forces applied to the control ends of the trunnions to counteract trunnion movements generated by a torque transmitted through the transmission thereby forcing the traction rollers on said pivot trunnions into force transmitting engagement with said toric discs.

2. A traction roller transmission according to claim 1, wherein a hydraulic operating cylinder is linked to the opposite end of said track member, said cylinder receiving a piston having a piston rod operatively connected to the control end of said trunnion.

3. A traction roller transmission according to claim 2, wherein said cylinder is supported by one end of a leverage arm whose other end is pivotally connected to the opposite end of said track member and which has a force control surface abutting the adjacent support structure to multiply the cylinder reaction forces applied by said leverage arm to said trunnion.

4. A traction roller transmission according to claim 3, wherein said force control surfaces of said leverage arm have curved end portions to provide for reduced wear at the tilting edges.

5. A traction roller transmission according to claim 3, wherein said leverage arm is forked with the cylinder being pivotally supported between the arm forks.

6. A traction roller transmission according to claim 1, wherein said transmission support structure includes support plates disposed radially adjacent said track members opposite the associated trunnion.

7. A traction roller transmission according to claim 6, wherein two trunnions are arranged opposite one another with respect to the axis of the toric discs and a number of tension rods extend through said support plates so as to balance the forces applied to said trunnions for the engagement of said traction rollers with said toric discs.

8. A traction roller transmission according to claim 7, wherein the trunnion ends opposite their control ends have grooves receiving at least one of said rods for guidance thereof.

9. A traction roller transmission according to claim 8, wherein said grooves are double V-shaped grooves with a narrow center area for engagement with said rods and arranged essentially in a plan receiving the pivot axis of said trunnions, the double V-shaped grooves having angles adapted to provide for the pivotal end positions of said trunnions.

* * * * *